(12) United States Patent
Lynch

(10) Patent No.: US 6,342,014 B1
(45) Date of Patent: Jan. 29, 2002

(54) EDUCATIONAL AND AMUSEMENT CENTER

(76) Inventor: Karin Lynch, 14630 Oxwick Cir., Houston, TX (US) 77044

( * ) Notice: Subject to any disclaimer, the term of this patent is extended or adjusted under 35 U.S.C. 154(b) by 0 days.

(21) Appl. No.: 09/576,380

(22) Filed: May 22, 2000

(51) Int. Cl.[7] .............................................. A63G 31/00
(52) U.S. Cl. ........................ 472/70; 472/116; 482/35; 434/267
(58) Field of Search .................... 472/70, 136, 137, 472/116, 117; 434/266, 267, 272; 482/35, 36

(56) References Cited

U.S. PATENT DOCUMENTS

| | | | | |
|---|---|---|---|---|
| 1,738,752 A | * | 12/1929 | Thomas | 472/136 X |
| 4,378,216 A | * | 3/1983 | Phillips | 434/159 |
| 4,865,550 A | * | 9/1989 | Chu | 434/267 |
| 5,405,304 A | * | 4/1995 | Petersheim et al. | 482/35 |

* cited by examiner

Primary Examiner—Kien T. Nguyen
(74) Attorney, Agent, or Firm—Russell J. Egan

(57) ABSTRACT

An entertainment and educational center based on human anatomy has a major unit corresponding to a major organ, or group of closely spaced and related organs, surrounded by related organs. The major unit, for example the heart, will be of adequate dimensions to allow movement by children and even adults through the several chambers and experience the architecture of the organ as well as its function. The major unit would be connected to associated organs, in this example lungs, by slides or bridges representing the arteries and other anatomical connections. The center may be provided with simulations of blood flow and beating and can be associated with nearby interactive teaching games.

10 Claims, 4 Drawing Sheets

EDUCATIONAL AND AMUSEMENT CENTER

BACKGROUND OF THE INVENTION

1. The Field of the Invention

The present invention relates to an educational and entertainment center and, in particular, to a center for teaching children facing medical treatment about their bodies enabling a better understanding of the procedures they will face.

2. The Prior Art

Educational and entertainment centers for children have been known for a long time. Most of the centers directed to themes are space, cartoon or even commercial corporate logos oriented. Few, if any, are intended to teach children about the human body.

Examples of known amusement centers are found in U.S. Pat. No. 4,805,897 to Dubeta; U.S. Pat. No. 5,167,595 to Gleeson et al; U.S. Pat. No. 5,226,864 to Showers; and U.S. Pat. No. 5,496,232 to Morris et al. While each of these centers may provide entertainment and exercise for children, they do not teach the child about human anatomy.

A few museums in major cities have displays on human anatomy. However, most of these displays are only slightly larger than life size with only a few large enough for a person to walk through. The museum displays tend to be less than user friendly and are heavily into the educational aspects only. It would be rare to find a museum display which approaches the subject of human anatomy in a manner suggesting fun, education, entertainment and some exercise involving movement through the display.

It is therefor an object of the present invention to provide an educational and entertainment center which will teach human anatomy and, in particular, teach the children about portions of their bodies which will be receiving medical treatment and just what is involved in the treatment. Each center would be concentrated on only a portion of the body, for example the cardiovascular system, the respiration system, or the digestive system The subject invention allows medical professionals to visually demonstrate to young patients and their parents the diagnosis and proposed treatment thereby providing a better understanding of the patient's condition. The interactive format of the present invention is intended to both reduce the anxiety over the condition and provide education and encouragement to lead a healthier life style in future years.

The physical activity provided by the subject invention will provide a subtle strength test and the opportunity to improve strength and general physical conditioning prior to under going medical treatment.

The present invention should also provide a center for waiting patients which will be more relaxing, particularly for young children, than uncomfortable, confining, and often boring waiting rooms.

SUMMARY OF THE INVENTION

The present invention is an entertainment and educational center based on human anatomy. The center has a major unit corresponding to a major organ, or group of closely spaced and related organs, surrounded by related organs. The major unit, for example the heart, will be of adequate dimensions to allow movement by children, and even adults, through the several chambers and experience the architecture of the organ as well as its function. The major unit is connected to associated organs, in this example lungs, by slides or bridges representing arteries, veins or other anatomic connections. The center may be provided with simulations of blood flow and life movement and can be associated with nearby interactive teaching games.

BRIEF DESCRIPTION OF THE DRAWINGS

The present invention will now be described, by way of example, with reference to the accompanying drawings in which.

DETAILED DESCRIPTION OF AN EMBODIMENT OF THE INVENTION

The present invention will be shown and described in an embodiment relating to the heart and lungs, although it is to be understood that the choice of the portions of the human anatomy which are to be featured can encompass any portion of the body, for example the head, or any group of related organs, such as the digestive system.

In this embodiment, the center 10 has a major unit 12 configured as a heart, adjacent subsidiary units 14, 16, which in this case are lungs, with a communication system 18 depicting the connecting arteries and veins.

Figure 1:
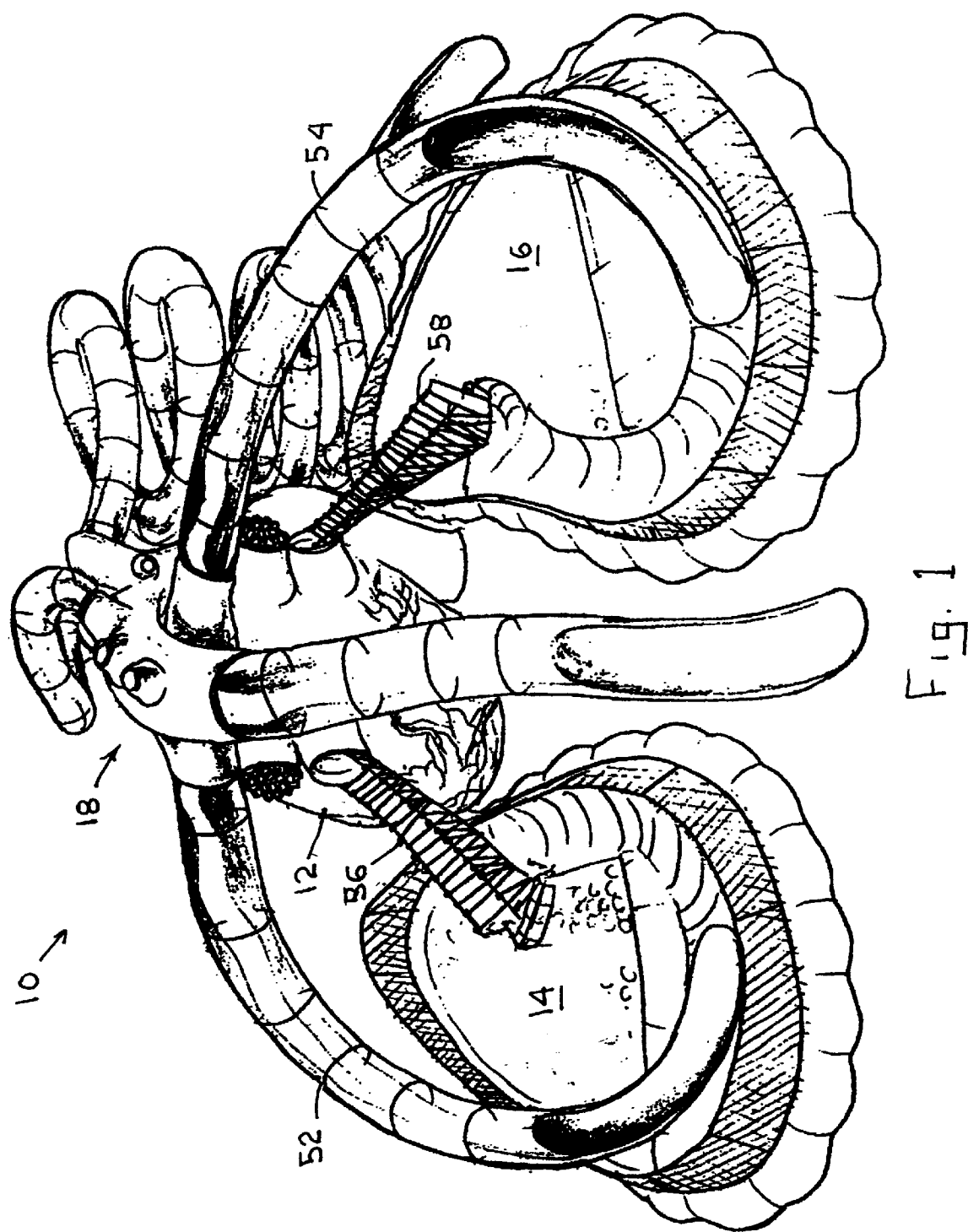
FIG. 1 is a perspective view of a preferred embodiment, namely heart and lungs, of the subject invention from a first direction.
Figure 2:
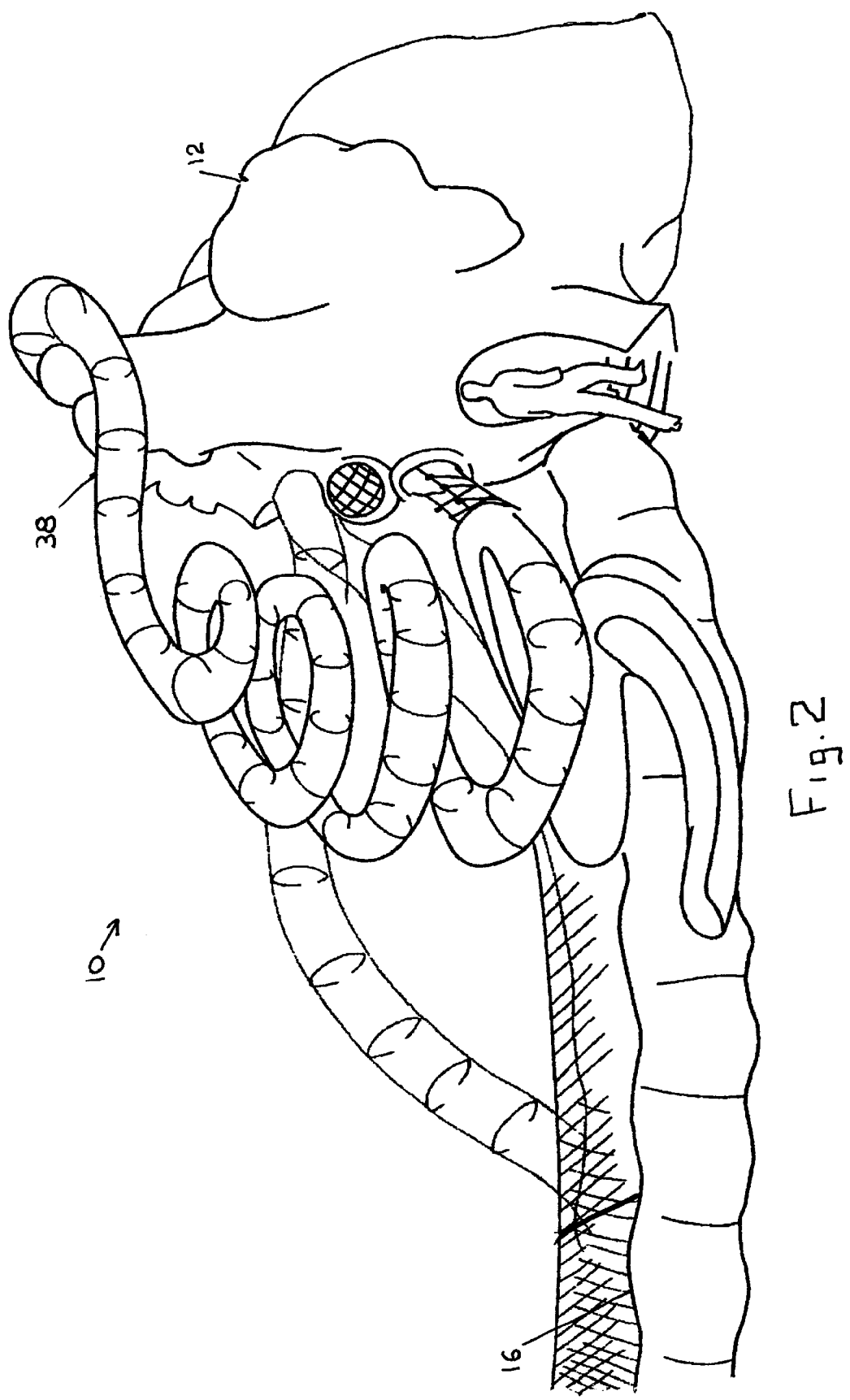
FIG. 2 is a perspective view of the embodiment of FIG. 1 from the opposite direction.
Figure 3:
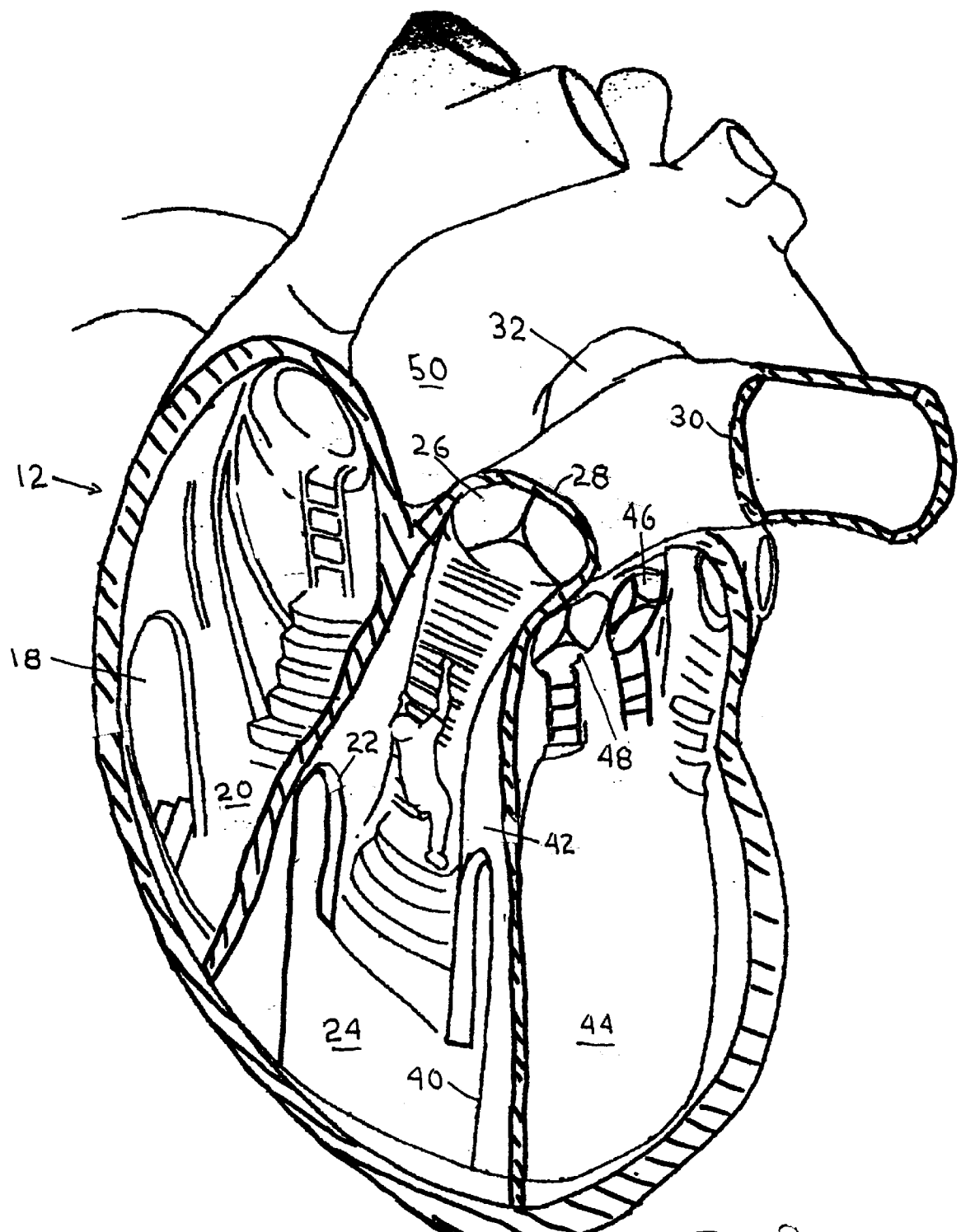
FIG. 3 is a detailed view, partially broken away, of the primary unit, namely a heart, of the preferred embodiment.

Turning to FIG. 3, the primary unit 12 is a heart having an entrance 18, simulating the inferior vena cava, entering into chamber 20, simulating the right auricle. This chamber is connected by a portal 22, representing the tricuspid valve, to the chamber 24, representing the right ventricle. Portal 26 serves to simulate the pulmonary valve leading to the tunnel 28 representing the pulmonary artery with the two branches thereof 30, 32 leading to the left and right lungs, 14, 16, respectively. A tunnel 34, containing climbing assisting means, such as a ladder 36, simulates the superior vena cava leading upwardly from the chamber 20, the right auricle. This can also provide an exit from the center via the slide 38 shown in FIG. 2. Portal 40 forms an opening in the wall 42, representing the normally complete septum, with the portal 40 representing a septal defect, which is one of the most common corrective heart surgeries performed on children. It also serves to allow entry to the chamber 44 which represents the left ventricle, with portal 46, simulating the mitral valve, leading to a chamber (not shown) representing the left auricle, and a portal 48, simulating the aortic valve, leading to the tunnel 50 representing the aurora. Preferably each of the above-mentioned portals simulates a valve by having at least one heavy or stiff plastic flap (see portals 26, 46, and 48 as examples) which allows opening for passage between the several chambers of the heart or between the various chambers and the respective arteries and veins connected thereto or, in the case of portal 40, a patch used to close an opening in the septum.

The center is preferably made from tough fiberglass or plastics materials and can be clear, translucent or colored as desired. The heart and its chambers are preferably of proportionate size to accommodate adults, although it is not necessary for the arteries etc. to be of that size. A grade school child is shown in FIG. 3 as a scale reference. The four chambers of the heart are on a similar scale and may be padded on the interior for safety. The valve simulations interconnecting the chambers preferably are formed by suspended flaps of heavy plastic sheet material, as mentioned above. These could, but need not, be anatomically correct. Simply covering the portal opening in such a way as to require some small amount of effort for passage will suffice.

Blood flow through the heart can be simulated by colored lights and/or by ventilated air flow. The lighting within the heart is appropriately red and blue representing the oxygenated and deoxygenated blood. This lighting preferably is arranged for sequential illumination, in the manner of Christmas "chase" lights, to indicate the direction of the blood flow. At least one of the artery/vein simulating climbing tubes leading to the slides and/or bridges is a double walled tube with at least the inner tube being formed of transparent material. Fluent material simulating blood flow is passed through the annular chamber between the inner and outer tubes to give the visual impression of being in an actual artery or vein.

It would be possible to simulate the beating of the heart either aurally from hidden sound sources and/or by pulsating the air flow. Any means for simulating the beating of the heart should be provided with controls to adjust the beating rate, to simulate physical activity and at least one vessel could be constructed to dilate or constrict accordingly to denote how blood is distributed properly.

Ventilation and air conditioning can be provided by known means and should provide air flow in the direction of blood flow through the heart, thereby also encouraging movement in the proper direction while teaching blood flow patterns. The air flow can also be pulsed to simulate the beating of the heart. This suggestion of a living beating heart can be further enhanced by broadcasting the sound of a beating heart within the major unit, as discussed above.

The slides 52, 54 and the bridges 56, 58 lead to the secondary units, in this case lungs 14, 16, respectively, which are filled with balls acting as a cushioned surface. The slides 52, 54 are preferably at least partially enclosed, as shown, for safety reasons and can be colored, transparent, or translucent. The bridges 56, 58 preferably are of the hanging or swinging type thereby providing excitement in the passage across them.

It would also be possible to represent bypass operations by having lengths of tubing (not shown), representing the veins used for bypasses. These can be made selectively attachable to the heart with the use of hook and loop material, such as Velcro (also not shown).

Another optional feature would be the representation of scar tissue (also not shown) for a myocardial infarction. Preferably this would be attachable and detachable with hook and loop material, such as Velcro, to emphasis what a healthy heart looks like and what a damaged heart looks like.

It is also possible to simulate various diagnostic tests, for example an echocardiographic test could be simulated by bouncing light beams, possible laser beams, off the surface of the heart. A coronary arteriography could be simulated by passing a thin tube through a vein or artery into a chamber of the heart. An arteriography (or angiography) is then simulated with the lighting system showing the flow of the injected dye. Test using radioactive isotopes could be simulated by lighting highlighting diseased tissues, the performance of the heart, distribution of blood flow in the heart, and abnormal movements in the heart.

Suitable safeguards would be provided throughout the center to prevent falls or entrapment by any portion of the center.

Figure 4:
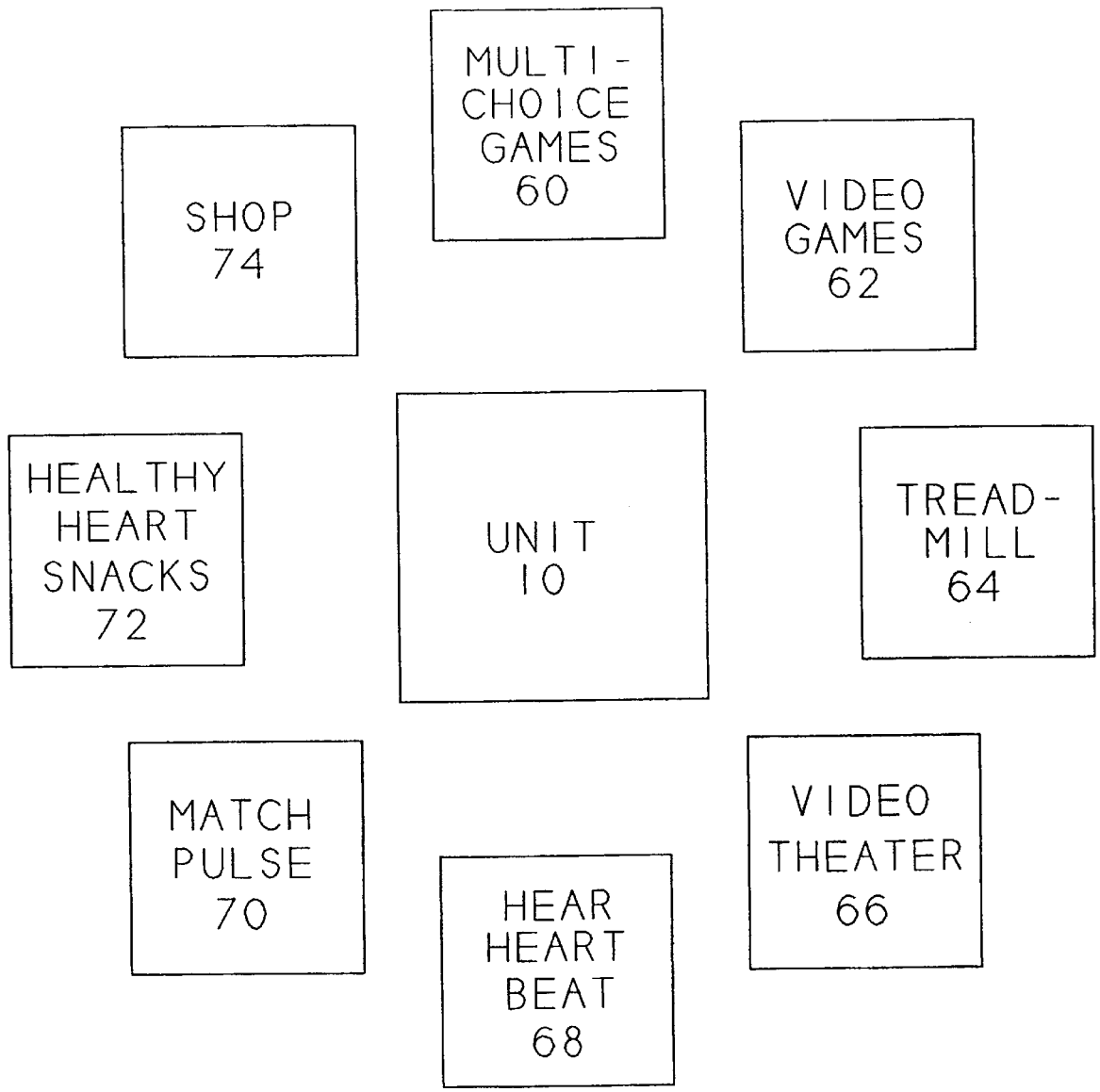
FIG. 4 is a block level schematic drawing of the subject invention in an entire entertainment and educational environment.

An entire entertainment and educational center is schematically shown on a block level in FIG. 4 and includes, in the immediate area surrounding the above described unit 10; interactive games such as: multiple choice games 60 related to cardiac and lung medical situations; video games 62 naming portions of the anatomy; treadmills or bikes 64 with pulse and/or cardiovascular activity measuring means; a video theater 66 for showing continuous or special showing of videos on heart related subjects; a listening station 68 where a patient can listen to their own heart beat and possibly compare the sound of their heart to heathy hearts and/or hearts with specific defect, such as a poorly functioning mitral valve; a game 70 which matches pulse rates to various activities; a heart healthy snack bar 72; and even a shop 74 where items, such as stethoscopes and informational materials, can be purchased.

The present invention may be subject to many modifications and changes without departing from the spirit or essential characteristics thereof. The present embodiment is therefor to be considered in all respects as being illustrative and not restrictive of the scope of the invention as defined by the appended claims.

I claim:

1. An educational and amusement center comprising:

a primary unit is a representation of the human heart having four chambers, each chamber being provided with means simulating the valves of the heart;

means simulating the pulsating of the heart including tactile simulation with pulsating air flow, audio simulation with the sound of a heart beating, visual simulation with movement of walls of said chambers;

means simulating flow of blood though the heart;

at least one secondary unit depicting a related organ of human anatomy closely spaced to said primary unit; and communication means joining said primary and said secondary units and simulating the anatomical connections therebetween.

2. The center according to claim 1 wherein said means simulating blood flow related to the heart comprises:

colored light means within said primary unit.

3. The center according to claim 1 wherein said means simulating blood flow related to the heart comprises:

lighting within said primary unit which lighting is sequentially lit.

4. The center according to claim 1 wherein said means simulating blood flow related to the heart comprises:

at least one double walled portion with simulated blood flowing in the cavity therebetween.

5. The center according to claim 1 wherein said secondary unit comprises a pit filled with a plurality of balls providing a soft landing pad.

6. The center according to claim 1 wherein said communication means comprises slides depicting veins and leading from a respective secondary unit the primary unit.

7. The center according to claim 1 wherein said communication means comprises bridges depicting arteries and leading from the primary unit to a respective secondary unit.

8. The center according to claim 1 wherein said communication means comprises slides and bridges depicting arteries and leading from the primary unit to a respective secondary unit.

9. The center according to claim 1 further comprising:

selectively attachable means simulating the connection of veins used bypass operations.

10. The center according to claim 1 further comprising:

a plurality of related education and entertainment satellites in close proximity.

* * * * *